US009049503B2

(12) United States Patent
Yiu

(10) Patent No.: US 9,049,503 B2
(45) Date of Patent: Jun. 2, 2015

(54) METHOD AND SYSTEM FOR BEAMFORMING USING A MICROPHONE ARRAY

(75) Inventor: Cedric Ka Fai Yiu, Hong Kong (HK)

(73) Assignee: The Hong Kong Polytechnic University, Hong Kong (HK)

( * ) Notice: Subject to any disclaimer, the term of this patent is extended or adjusted under 35 U.S.C. 154(b) by 1577 days.

(21) Appl. No.: 12/405,870

(22) Filed: Mar. 17, 2009

(65) Prior Publication Data

US 2010/0241428 A1 Sep. 23, 2010

(51) Int. Cl.

| | |
|---|---|
| ***G10L 21/02*** | (2006.01) |
| ***G10K 11/16*** | (2006.01) |
| ***H04B 15/00*** | (2006.01) |
| ***H04R 3/00*** | (2006.01) |
| *G10K 11/178* | (2006.01) |
| *G10L 21/0216* | (2013.01) |

(52) U.S. Cl.

CPC .............. *H04R 3/005* (2013.01); *G10K 11/178* (2013.01); *G10L 2021/02166* (2013.01); *H04R 2430/20* (2013.01)

(58) Field of Classification Search

CPC ............. G01L 2021/0208; G01L 2021/02165; G01L 2021/02166; G01L 2021/00; G01L 21/00; G01L 21/0208; G01L 21/0224; G01L 21/0232

USPC ......... 704/200, 211, 205, 226, 227, 228, 225; 381/71.1, 71.11, 94.1, 95, 92; 709/24

See application file for complete search history.

(56) References Cited

U.S. PATENT DOCUMENTS

| | | | | |
|---|---|---|---|---|
| 6,192,072 | B1 * | 2/2001 | Azadet et al. | 375/233 |
| 6,836,243 | B2 * | 12/2004 | Kajala et al. | 342/377 |
| 6,999,378 | B2 * | 2/2006 | Beaucoup | 367/119 |
| 7,778,425 | B2 * | 8/2010 | Kajala et al. | 381/92 |
| 7,957,542 | B2 * | 6/2011 | Sarrukh et al. | 381/92 |
| 8,005,238 | B2 * | 8/2011 | Tashev et al. | 381/94.2 |
| 8,085,949 | B2 * | 12/2011 | Kim et al. | 381/94.1 |
| 8,139,787 | B2 * | 3/2012 | Haykin et al. | 381/94.1 |
| 2008/0019537 | A1 * | 1/2008 | Nongpiur et al. | 381/71.7 |
| 2008/0317254 | A1 * | 12/2008 | Kano | 381/71.4 |
| 2009/0034752 | A1 * | 2/2009 | Zhang et al. | 381/92 |
| 2009/0089053 | A1 * | 4/2009 | Wang et al. | 704/233 |
| 2010/0130198 | A1 * | 5/2010 | Kannappan et al. | 455/434 |

OTHER PUBLICATIONS

Ka Fai Cedric Yiu, Nedelko Grbia, Sven Nordholm, Kok Lay Teo, A hybrid method for the design of oversampled uniform DFT filter banks, Signal Processing, vol. 86, Issue 7, Jul. 2006, pp. 1355-1364, ISSN 0165-1684, 10.1016/j.sigpro.2005.02.023.*

Yiu, Ka Fai Cedric, et al. "Reconfigurable acceleration of microphone array algorithms for speech enhancement." ASAP. 2008.*

(Continued)

*Primary Examiner* — Paras D Shah

(74) *Attorney, Agent, or Firm* — Muncy, Geissler, Olds & Lowe, P.C.

(57) ABSTRACT

A system (10) for beamforming using a microphone array, the system (10) comprising: a beamformer consisting of two parallel adaptive filters (12, 13), a first adaptive filter (12) having low speech distortion (LS) and a second adaptive filter (13) having high noise suppression (SNR); and a controller (14) to determine a weight (θ) to adjust a percentage of combining the adaptive filters (12, 13) and to apply the weight to the adaptive filters (12, 13) for an output (15) of the beamformer.

15 Claims, 6 Drawing Sheets

(56) References Cited

OTHER PUBLICATIONS

B.V. Veen and K. Buckley, "Beamforming: a versatile approach to spatial filtering," *IEEE ASSP Magazine*, vol. 5, No. 2, pp. 4-24, 1998.

K.F.C. Yiu, N. Grbíc, K.L. Teo, and S. Nordholm, "A new design method for broadband microphone arrays for speech input in automobiles," *IEEE Signal Processing Letters*, vol. 9, No. 7, pp. 222-224, 2002.

M. Dahl and I. Claesson, "Acoustic noise and echo canceling with microphone array," *IEEE Transactions on Vehicular Technology*, vol. 48, No. 5, pp. 1518-1526, 1999.

S. Nordholm, I. Claesson, and M. Dahl, "Adaptive microphone array employing calibration signals: an analytical evaluation," *IEEE Transactions on Speech and Audio Processing*, vol. 7, No. 3, pp. 241-252, 1999.

K.F.C. Yiu, Y. Liu, and K.L. Teo, "A hybrid descent method for global optimization," *Journal of Global Optimization*, vol. 28, No. 2, pp. 229-238, 2004.

* cited by examiner

METHOD AND SYSTEM FOR BEAMFORMING USING A MICROPHONE ARRAY

TECHNICAL FIELD

The invention concerns a method and system for beamforming using a microphone array.

BACKGROUND OF THE INVENTION

Voice control devices have many applications including logistics warehouse control and intelligent home design. In the electronic industry, it is also popular to add voice control functionality to products such as home appliances and toys. There are a number of voice recognition systems in the market and very mature products in both hardware and software are available. They are usually based on a hidden Markov chain and are trained to recognize the commands using a large database of speech signals. A system can be programmed to take speech commands to activate other functions. However, in a noisy work environment, various background noises create an application constraint to the system. A certain signal-to-noise ratio is required for such a system to work properly. When the signal-to-noise ratio is too low, the performance of such a system will deteriorate significantly. In an acoustic environment with possible strong near-field noise, a microphone array is required to suppress noise while leaving the distortion of the speech to a minimum. Since this problem is very difficult to be described by a priori models, sequences of calibration signals are often used for the design of the beamformer.

Generally, the optimal beamformer design problem is a multi-criteria decision problem, where the criteria are the level of distortion and the level of noise suppression. The least-squares technique (LS) and the signal-to-noise ratio (SNR) are often used to optimize for the performance of the beamformer. However, the least-squares technique tends to concentrate on distortion control with deficiency in noise suppression. Similarly, using the signal-to-noise ratio, distortion is usually significant, although noise suppression can be achieved. For voice control applications, a balance is required between the two extreme controls. One way to improve performance is to increase the length of the filter. Nevertheless, it is a very costly way and it still cannot guarantee an acceptable design for voice control devices.

SUMMARY OF THE INVENTION

In a first preferred aspect, there is provided a method for beamforming using a microphone array. The method includes: providing a beamformer consisting of two parallel adaptive filters, a first adaptive filter having low speech distortion (LS) and a second adaptive filter having high noise suppression (SNR); and determining a weight (θ) to adjust a percentage of combining the adaptive filters; and generating an output of the beamformer by applying the weight (θ) to the adaptive filters.

The weight (θ) may be determined by defining a linear combination of the optimal filter weights to produce a balance between minimising distortion and maximising noise suppression which are continuously adjusted.

The adjusting of the weight (θ) may be by applying a hybrid descent algorithm based on a combination of a simulated annealing algorithm and a simplex search algorithm.

The weight (θ) may be adjusted depending on the application. The application may be to maximize speech recognition accuracy.

The method may further include an initial step of pre-calibration.

In a second aspect, there is provided a system for beamforming using a microphone array. The system includes: a beamformer consisting of two parallel adaptive filters, a first adaptive filter having low speech distortion (LS) and a second adaptive filter having high noise suppression (SNR); and a controller to determine a weight (θ) for adjusting a percentage of combining the adaptive filters and to apply the weight (θ) to the adaptive filters for an output of the beamformer.

The system may further include a noise only detector to adapt the filter coefficients only when there is noise present in the received signal.

The system may be implemented by a Field Programmable Gate Array (FPGA), the FPGA comprising:

- a computer processor;
- an Auxiliary Processor Unit (APU) interface in operative connection with the computer processor;
- a Fabric Co-processor Bus (FCB) in operative connection with the APU interface; and
- a hardware accelerator in operative connection with the FCB, the hardware accelerator including an FCB interface, Fast Fourier Transform/inverse Fast Fourier Transform (FFT/IFFT) module and a Least Squares (LS) and Signal to Noise Ratio (SNR) UPDATE module.

By optimizing on the balance between the least-squares technique and the signal-to-noise ratio technique, a novel design of beamformers is provided. A hybrid optimization algorithm optimizes the speech recognition accuracy directly to design the required beamformer. Without increasing the required filter length, the optimized beamformer can achieve significantly better speech recognition accuracy with a high near-field noise and a high background noise.

The beamforming system of the present invention requires two parallel filters. A first filter is designed to keep speech distortion to a minimum (for example, by the least-squares technique). The second filter is designed to reduce noise to the maximum (for example, based on the signal-to-noise ratio). Both filters share a common structure. They can be efficient if subband processing is used, which includes an adaptive frequency domain structure consists of a multichannel analysis filter-bank and a set of adaptive filters, each adapting on the multichannel subband signals. The outputs of the beamformers are reconstructed by a synthesis filter-bank in order to create a time domain output signal. Information about the speech location is put into the algorithm by a recording performed in a low noise situation, simply by putting correlation estimates of the source signal into a memory. The recording only needs to be done initially or whenever the location of interest is changed. The adaptive algorithm is then run continuously and the reconstructed output signal is the extracted speech signal.

For a given pre-trained speech recognizer with a finite set of speech commands, simple designs may not lead to improvement in recognition accuracy due to the high complexity in the recognizer. By optimizing on the speech recognition accuracy directly together with a balance between the parallel filters using, for example, a hybrid optimization algorithm, the optimized beamformer can achieve significantly better speech recognition accuracy with a high near-field noise and a high background noise. Essentially the same technique can be applied to optimize on a speech quality perception measure to obtain a high quality enhanced speech signal.

In order to achieve real-time performance, the implementation of the beamformer on a high-end FPGA is preferred. The complete architecture is simulated in hardware to aim for real-time operation of the final beamformer. FPGA is particularly suitable because these two filters are parallel in nature. Fixed point arithmetics are applied mostly except for certain part of the calculations where floating point arithmetics are carried out. Based on a careful calibration on the required numerical operations, the required floating point operations remain a very small proportion relative to the fixed point operations while maintaining the accuracy in the final results. In addition, optimization based on bitwidth analysis to explore suitable bitwidth of the system is carried out. The optimized integer and fraction size using fixed point arithmetic can reduce the overall circuit size by up to 80% when compared with a direct realization of the software onto an FPGA platform. The performance criteria based on distortion and noise reduction are used to assess the accuracy in the optimized system. Finally, hardware accelerator is equipped to perform the most time consuming part of the algorithm. The acceleration is evaluated and compared with a software version running on a 1.6 GHz Pentium M machine, showing that the FPGA-based implementation at 184 MHz can achieve real-time performance.

In a signal model, there are M elements in the microphone array. Generally, the signals received by the microphone element can be represented by $$x_i(k)=s_i(k)+n_i(k), i=1,2, \ldots ,M, \tag{1}$$

where $s_i(n)$ and $v_i(n)$ is the source signal and the noise signal, respectively. The noise signal could include a sum of fixed point noise sources together with a mixture of coherent and incoherent noise sources. Known calibration sequence observations are used for each of these signals.

The source is assumed to be a wideband source, as in the case of a speech signal, located in the near field of a uniform linear array of M microphones. The beamformer uses finite length digital linear filters at each microphone. The output of the beamformer is given by $$y[n] = \sum_{i=1}^{M} \sum_{j=0}^{L-1} w_i[j] x_i[n-j] \tag{2}$$

where L−1 is the order of the FIR filters and $w_i[j]$, j=0, 1, . . . , L−1, are the FIR filter taps for channel number i. The signals, $x_i[n]$, are digitally sampled microphone observations and the beamformer output signal is denoted y [n].

These FIR filters need to have a high order to capture the essential information especially if they also need to perform room reverberation suppression. By using a subband beamforming scheme, the computational burden will become substantially lower. Each microphone signal is filtered through a subband filter. A digital filter with the same impulse response is used for all channels thus all spatial characteristics are kept. This means that the large filtering problem is divided into a number of smaller problems.

The signal model can equivalently be described in the frequency domain and the filtering operations will in this case become multiplications with number K complex frequency domain representation weights, $w_i^{(k)}$. For a certain subband, k, the output is given by $$y^{(k)}[n] = \sum_{i=1}^{I} w_i^{(k)} x_i^{(k)}[n] \tag{3}$$

where the signals, $x_i^{(k)}[n]$ and $y^{(k)}[n]$, are time domain signals as specified before but they are narrower band, containing essentially components of subband k. The observed microphone signals are given in the same way as $$x_i^{(k)}[n]=s_i^{(k)}[n]+v_i^{(k)}[n] \tag{4}$$

and the optimization objective will be simplified, due to the linear and multiplicative property of the frequency domain representation. For all k, if speech distortion is important, some measures of the difference between $y^{(k)}[n]$ and $s^{(k)}[n]$ is minimised. However, if noise reduction is important, some measures of the noise component $$\left\| \sum_{i=1}^{I} w_i^{(k)} v_i^{(k)}[n] \right\|$$

is minimised.

There are different ways to achieve these two objectives. An estimate of the noise component $\{v_i(n), i=1, \ldots, M\}$ can easily be carried out by turning on the system without speech from the users. A more elaborated method is to use a noise detector, (for example, a voice activity detector that is optimized to find noise), to extract the noise component. A pre-recorded signal can be used as the calibration speech signal $\{s_i(n), i=1, \ldots, M\}$. If the configuration of the microphone array needs to be changed, a signal propagation model can be adopted to adjust the pre-recorded calibration speech signals to the required ones. Another option is to record this calibration speech signal by the users. One example of a beamformer with good speech distortion property is the least-squares method, while one example of beamformer with good noise suppression property is the maximization of the signal-to-noise ratio.

If a least-squares criterion is used to measure the mismatch between y [n] and s [n], the objective is formulated in the frequency domain as a least squares solution defined for a data set of N samples. The optimal solution can be solved approximately as follows:

$$w_{opt}^{(k)}(N)=[\hat{R}_{ss}^{(k)}(N)+\hat{R}_{xx}^{(k)}(N)]^{-1}\hat{r}_s^{(k)}(N) \tag{5}$$

where the array weight vector, $w_{opt}^{(k)}$ for the subband k is defined as $$w_{opt}^{(k)}=[w_1^{(k)}, w_2^{(k)}, \ldots w_1^{(k)}]^T. \tag{6}$$

The source correlation estimates can be pre-calculated in the calibration phase as $$\hat{R}_{ss}^{(k)}(N) = \frac{1}{N} \sum_{n=0}^{N-1} s^{(k)}[n] s^{(k)^H}[n] \tag{7}$$

$$\hat{r}_s^{(k)}(N) = \frac{1}{N} \sum_{n=0}^{N-1} s^{(k)}[n] s_r^{(k)^*}[n] \tag{8}$$

where the superscript * denotes conjugation while the superscript H denotes Hermitian transpose, and $$s^{(k)}[n]=[s_1^{(k)}[n], s_2^{(k)}[n], \ldots s_1^{(k)}[n]]^T$$

are microphone observations when the calibration source signal is active alone. The observed data correlation matrix estimate $\hat{R}_{xx}^{(k)}(N)$ can be calculated similar to (8). In addition, $\hat{R}_{xx}^{(k)}(N)$ can be updated and adapted recursively and adaptively from the received data to capture the characteristics of changing noise.

Signal to Noise Ratio (SNR)

By viewing the observed microphone signals as a signal part and as a noise/interference part, optimum beamformers can be defined based on different power criteria. It is popular to deal with the optimal Signal-to-Noise Ratio beamformer. The beamformer is also referred to as the maximum array gain beamformer. Generally, the optimization procedure to find the SNR relies on numerical methods to solve a generalized eigenvector problem.

By measuring the output signal-to-noise power ratio (SNR), it becomes maximizing a ratio between two quadratic forms of positive definite matrices as $$w_{opt} = argmax_w \left\{ \frac{w^H \hat{R}_{ss} w}{w^H \hat{R}_{xx} w} \right\} \tag{9}$$

is referred to as the generalized eigenvector problem. It can be rewritten by introducing a linear variable transformation $$v = \hat{R}_{xx}^{1/2} w \tag{10}$$

and combining it with equation (9). This gives the Rayleigh quotient, $$v_{opt} = \underset{v}{\text{argmax}} \left\{ \frac{v^H \hat{R}_{xx}^{-H/2} \hat{R}_{ss} \hat{R}_{xx}^{-1/2} v}{v^H v} \right\} \tag{11}$$

where the solution, $v_{opt}$, is the eigenvector which belongs to the maximum eigenvalue, $\lambda$, of the combined matrices in the numerator. This is equivalent to meet the following relation $$\hat{R}_{xx}^{-H/2} \hat{R}_{ss} \hat{R}_{xx}^{-1/2} v_{opt} = \lambda v_{opt} \tag{12}$$

and the final optimal weights are given by the inverse of the linear variable transformation $$w_{opt} = \hat{R}_{xx}^{-1/2} v_{opt} \tag{13}$$

The square root of the matrix is easily found from the diagonal form of the matrix. Generally, the optimal vector can only be found by numerical methods and the time domain formulation is therefore more numerically sensitive since the dimension of the weight space is L times greater than the dimension of the frequency domain weight space.

The formulation of the optimal signal-to-noise beamformer can be done for each frequency individually. The weights that maximizes the quadratic ratios for all frequencies, is the optimal beamformer that maximizes the total output power ratio. This is provided that the different frequency bands are independent and the full-band signal can be created perfectly.

For frequency subband k, the quadratic ratio between the output signal power, and the output noise power is $$w_{opt}^{(k)} = argmax_{w}(k) \left\{ \frac{w^{(k)H} \hat{R}_{SS}^{(k)} w^{(k)}}{w^{(k)H} \hat{R}_{XX}^{(k)} w^{(k)}} \right\}. \tag{14}$$

The present invention provides a parallel adaptive structure that is adapted independently. No feedback component is needed for either adaptive filter. A feedback component is introduced only to adjust the correct weighting for both adaptive filters and their filter signals. These have significant savings in implementation of the method of the present invention.

BRIEF DESCRIPTION OF THE DRAWINGS

An example of the invention will now be described with reference to the accompanying drawings, in which.

DETAILED DESCRIPTION OF THE DRAWINGS

Figure 1:
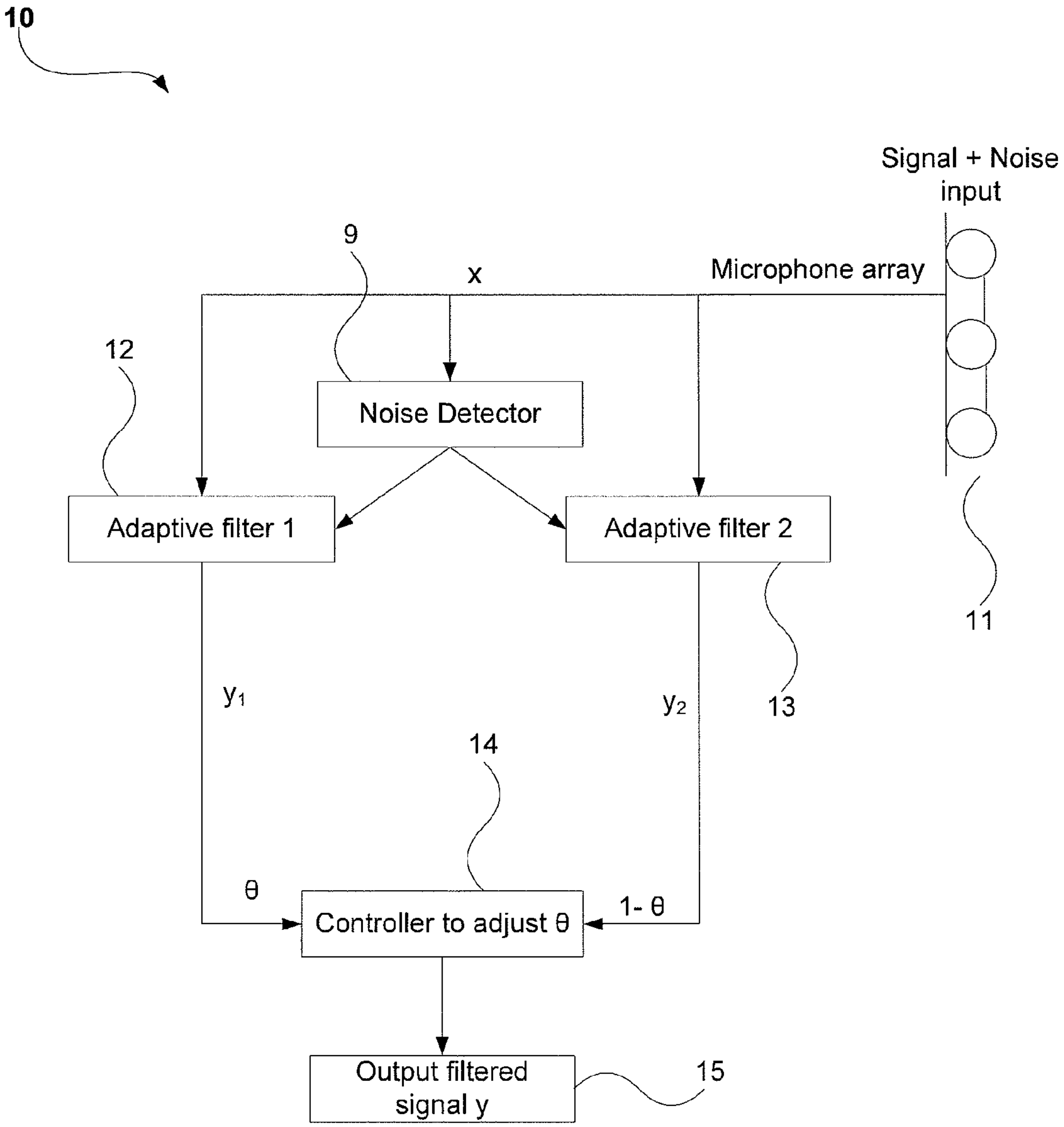
FIG. 1 is a block diagram of a parallel filter system according to an embodiment o the present invention.

Referring to FIG. 1, a parallel filter system 10 is provided. The input 11 consists of an audio signal of interest and noise which is captured by a microphone array. The parallel filter system 10 or beamformer has two parallel adaptive filters 12, 13 to filter the input 11. The optimal filter weights are $w_1^{opt}$ (e.g. $w_{LS}^{opt}$) and $w_2^{opt}$ (e.g. $w_{SNR}^{opt}$). Each filter weight has its unique property in noise suppression and signal distortion. A linear combination of these two filter weights is formed which will adjust the distortion and noise suppression continuously in a Pareto fashion to form:

$$w_\theta^{(k)} = w_1^{(k)} + (1-\theta) * w_2^{(k)}. \tag{15}$$

For each subband k, using $w_\theta^{(k)}$ as the weight in $$y[n] = \sum_{i=1}^{M} \sum_{j=0}^{L-1} w_i[j] x_i[n-j],$$

the filtered subband signals $y_{out}^{(k)}[n]$ can be calculated. The time domain signal $y_{out}[n]$ can then be reconstructed by these subband signals via a synthesis filterbank.

A noise only detector 9 is added in another embodiment for the adaptive process of the filters. For example, a voice activity detector optimized to find noise, so that the filter coefficients are adapted when there is only noise present in the received signal x.

After filtering by the adaptive filters 12, 13, the filtered signals are passed to a controller 14. The controller 14 adjusts θ based on certain criteria to generate an output filtered signal y 15. The criteria can be speech quality measure or it can be speech recognition accuracy measure. The use of a speech recognition accuracy measure is described as an example. In a typical environment of using a pre-trained speech recognizer based on the principle of a hidden Markov model, there is a fixed set of $\bar{n}$ voice commands, denoted by $\{s^1, s^2, \ldots, s^{\bar{n}}\}$, built into the dialog between the system and users. A dialog is defined as a finite state machine which consists of states and transitions. A dialog state represents one conversational interchange between the system and user, typically consisting of a prompt and then the user's response. The system constantly listens to the trigger phrase in the system standby phase. As soon as the user says the general-purpose trigger phrase, the system will respond with an acknowledgement tone. The caller responds to specify the desired transaction. The caller may respond in a variety of ways but must include one of several keywords that define a supported transaction. For a user profile transaction, an application will retrieve the pre-programmed setting of the specified user, and prompt the user with a confirmation before returning to the system standby state.

Due to the presence of acoustic noise in the environment, the input commands are usually distorted by noise, given by $$x^i=s^i+v^i i=1, \ldots, \bar{n}. \tag{16}$$

A noise filter is used to give the estimate signal $y_i$. The noise filter could be the subband filtering together with the process of reconstruction via synthesis filterbank. For the received ith command, a vector of scores is calculated, denoted by $$L_1\{(y_i), \ldots, L_{\bar{n}}(y_i)\} \tag{17}$$

where $L_j(y_i)$ stands for the likelihood that the received command is the jth command. With filtering, the estimated command is taken to be $$\hat{\imath} = \underset{j}{\text{argmax}}\{L_{\bar{n}}(y_i)\} \tag{18}$$

$N_i=\min(|\hat{\imath}-i|,1)$ is defined. The score of correct recognition for a pre-recorded command set or a calibrated command set recorded in a quiet environment can be calculated as $$S(\theta) = 1 - \frac{\sum_{i}^{\bar{n}} N_i}{\bar{n}}, \tag{19}$$

where S is a function of θ due to the subband filtering process $$y[n] = \sum_{i=1}^{M}\sum_{j=0}^{L-1} w_i[j]x_i[n-j]$$

with the weight (15). It is sufficient to maximize S with respect to θ. There are many different techniques to solve this problem. For example, a simulated annealing algorithm is applied.

FPGA Hardware Architecture and Design

Figure 2:
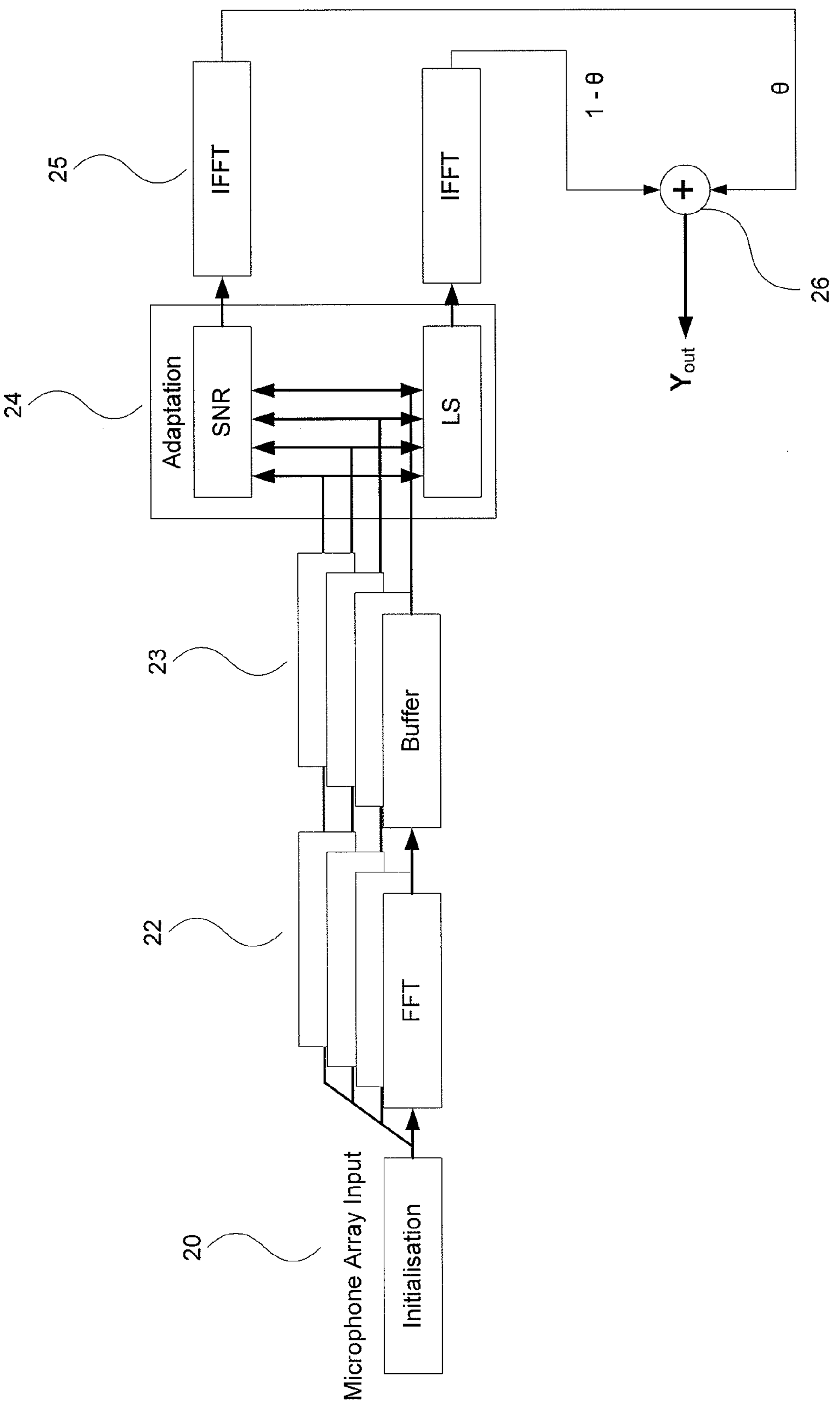
FIG. 2 is a process flow diagram of the dataflow of the operations of the system of FIG. 1.

The parallel filters system 10 is implemented by reconfigurable hardware. In order to reduce the size of the circuit and increase the performance, several techniques have been applied which exploits the flexibility of reconfigurable hardware. The computation time is greatly reduced by implementing the actual filtering in the frequency domain. It involves the signal transformations from time domain to frequency domain and vice versa. FIG. 2 is a flow chart including the following calculation steps:

1. Transform 22 the input signals to their frequency domain representations via Fast Fourier Transform (FFT);
2. Filter 24 the subband signals by the subband impulse response estimates;
3. Synthesize 25 the impulse response estimates back to the time domain via IFFT (inverse FFT).

The algorithms are analyzed to determine an optimized way to translate them to the reconfigurable hardware. The translation guarantees computational efficiency by exploiting the parallelism property of the algorithm running in the frequency domain, which can be optimized at several levels:

Loop level parallelism—consecutive loop iterations can be executed in parallel;

Task level parallelism—entire procedures inside the program can be executed in parallel;

Data parallelism.

The algorithms involve control components and computation components. To determine suitable components to be implemented on the hardware, computationally intensive kernels in the algorithms are identified by profiling. When profiling is carried out, time consuming operations can be determined and will be implemented in hardware. The profiling results of the main operations are shown in table 1. This indicates that the FFT/IFFT and two UPDATE operations are the best candidates to be implemented into hardware. They occupy 80% of the CPU time. These kernels are mapped on dedicated processing engines of the system, optimized to exploit the regularity of the operations operated on large amounts of data, while the remaining parts of the code is implemented by software running on the PowerPC processor 30. An FPGA device 29 embedded with processors is a suitable platform for this system. For instance, Xilinx Virtex-4 FX FPGA device 29 is selected as the target platform. The Auxiliary Processor Unit (APU) interface 31 in the device 29 simplifies the integration of hardware accelerators 34 and co-processors. These hardware accelerators 34 functions operate as extensions to the PowerPC processor 30, thereby offloading the processor from demanding computational tasks.

Figure 3:
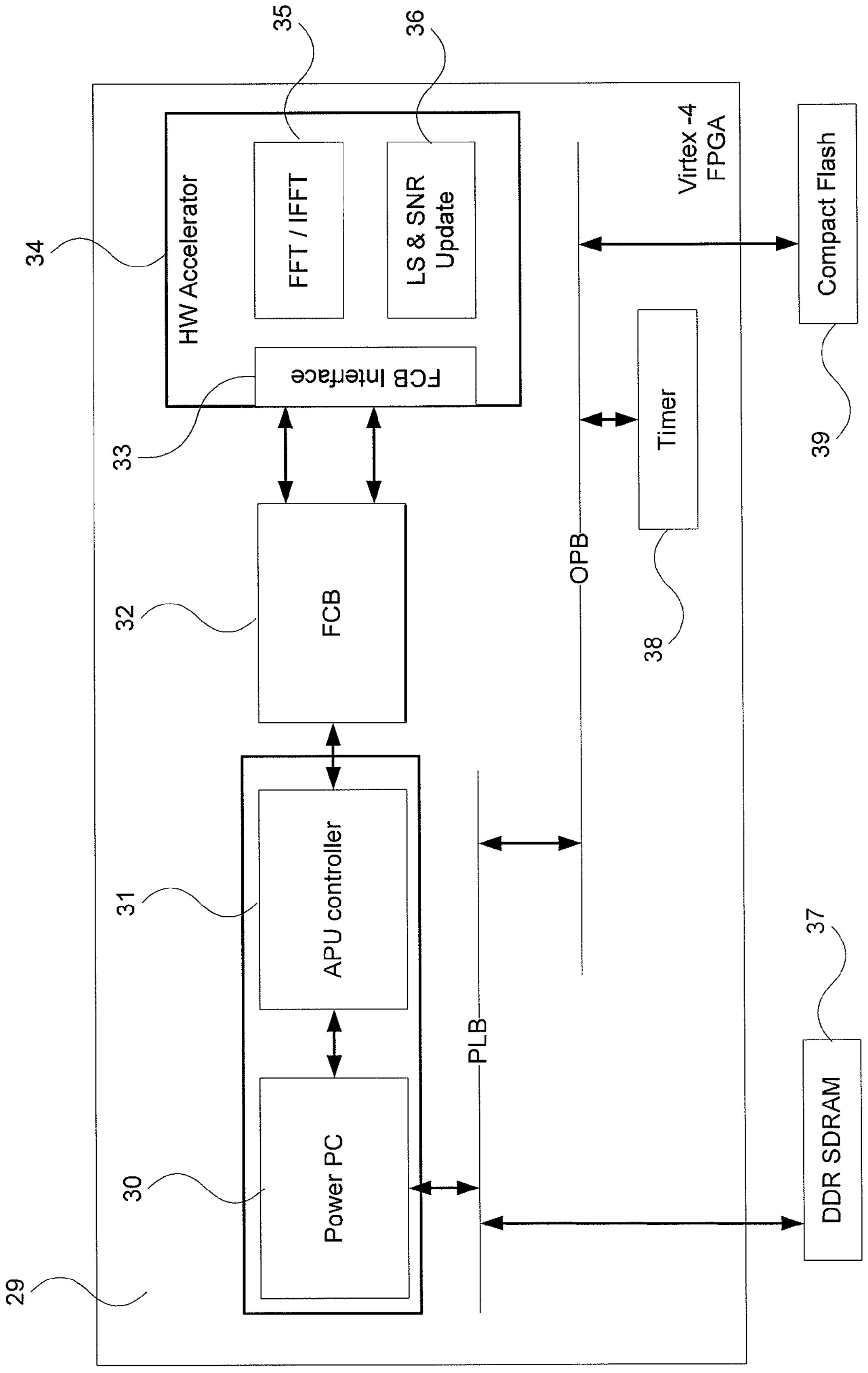
FIG. 3 is a block diagram of a beamformer architecture according to an embodiment o the present invention.

Referring to FIG. 3, the beamformer architecture is depicted. The PowerPC processor 30 is connected with a main memory module (DDR SDRAM) 37 via the processor local bus (PLB). The PLB together with an onchip peripheral bus (OPB) enables the processor 30 to also have access to a timer clock 38 and a non-volatile memory (Compact Flash) 39. A hardware accelerator 34 is connected to the processor 30 using a Fabric Co-processor Bus (FCB) 32 and is controlled by an APU controller 31. The FCB 32 splits into two different channels to an FCB interface 33. The first channel is to allow the processor 30 to access the FFT/IFFT module 35, while the second one is connected to LS UPDATE module 36.

TABLE 1

Profiling Results of the Main Operations

| Function | % Overall Time |
|---|---|
| LS UPDATE | 31.8% |
| 24-bit FFT/IFFT (32 pt) | 28.8% |
| SNR UPDATE | 19.4% |
| OTHERS | 20% |

For architecture exploration, a set of architecture parameters are defined in hardware description language (HDL) to specify bus width, the polarity of control signals, the functional units which should be included or excluded. Since these operations are performed in the frequency domain, a high degree of parallelism can be achieved by dividing the frequency domain into different subbands and processing them independently. Therefore, multiple instances of the UPDATE module 36 can be instantiated into the hardware accelerator 34 to improve performance. Thus, the architecture allows different areas and performance combination. Therefore, the architecture can be implemented on different sizes of FPGA devices with trade-off in area or performance.

Figure 4:
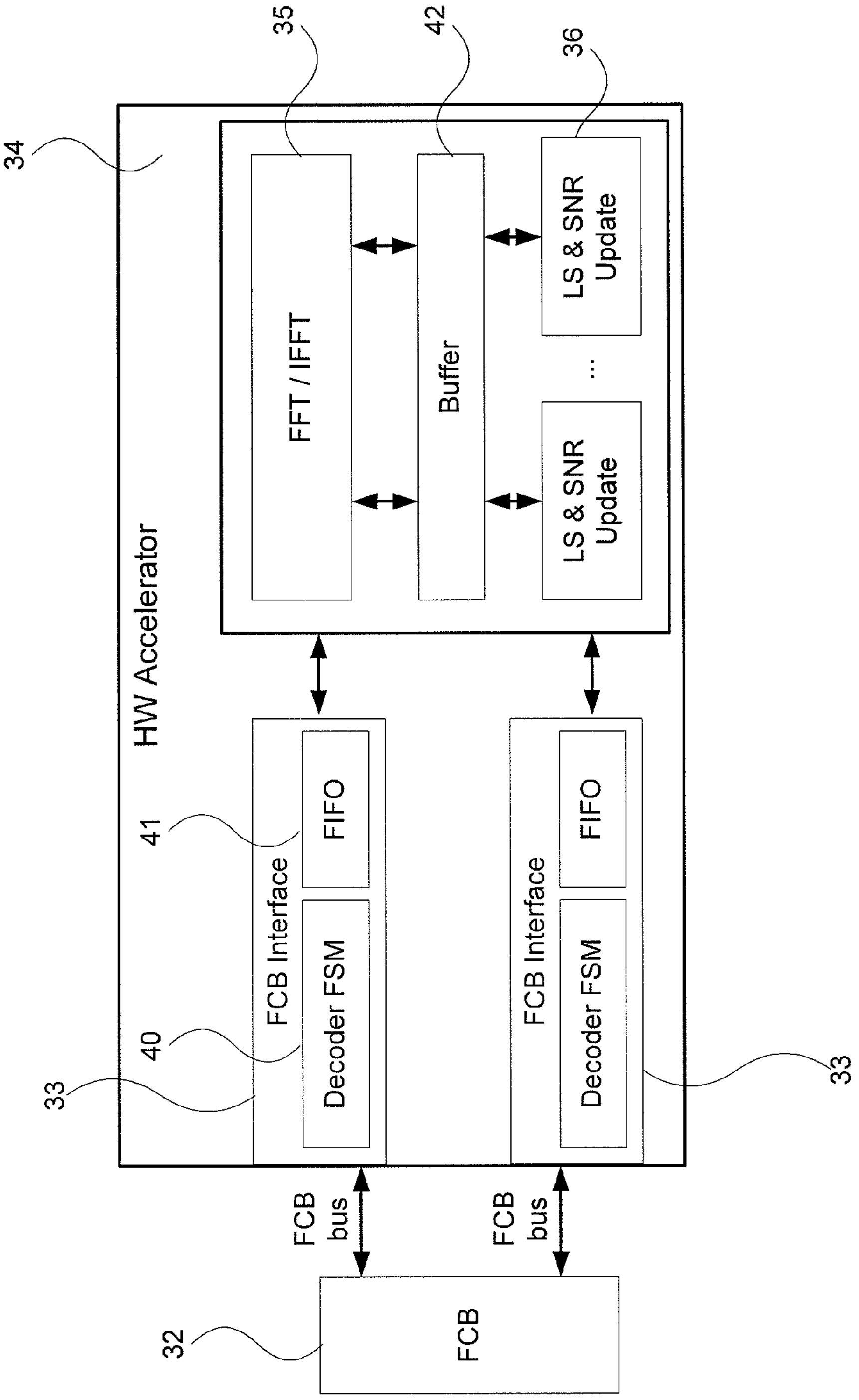
FIG. 4 is a block diagram of a hardware accelerator according to an embodiment o the present invention.

Key Features of the Hardware Accelerator 34 are:

Parallelism: The functional units can operate independently from each other in a sub-band frequency domain. When different functional units commit their elaboration simultaneously, a multi-port register file allows concurrent write-back of corresponding results;

Scalability and adaptability: The functional units can be inserted or removed from the architecture by specifying corresponding values in the HDL description. The HDL description is parameterized and the user can adjust architecture parameters such as buswidth, latency of functional units and throughput;

Modularity of the functional units: Each functional unit is dedicated to implement an elementary arithmetic operation. It can be removed from the architecture and can be used as a stand-alone computational element in other designs;

Referring to FIG. 4, the details of the hardware accelerator 34 is shown. The hardware accelerator 34 includes FCB interface logic 33, FFT/IFFT modules 35 and instances of LS UPDATE modules 36. The FCB interface logic 33 contains a finite state machine (FSM) 40 and a First In First Out (FIFO) 41 and it is responsible for data transfer between the computation modules 35, 36 and the processor 30. In addition, there is a temporary buffer 42 for storing intermediate results such that each computation modules 35, 36 can access the data from each other immediately.

The FFT/IFFT module 35 is responsible for analyzing and synthesizing data. The UPDATE 36 module sends weights update data (Error-Rate Product) and receives a confirmation of weight update completion. The buffer module 42 acts as communication channel between the logic modules 35, 36.

Figure 5:
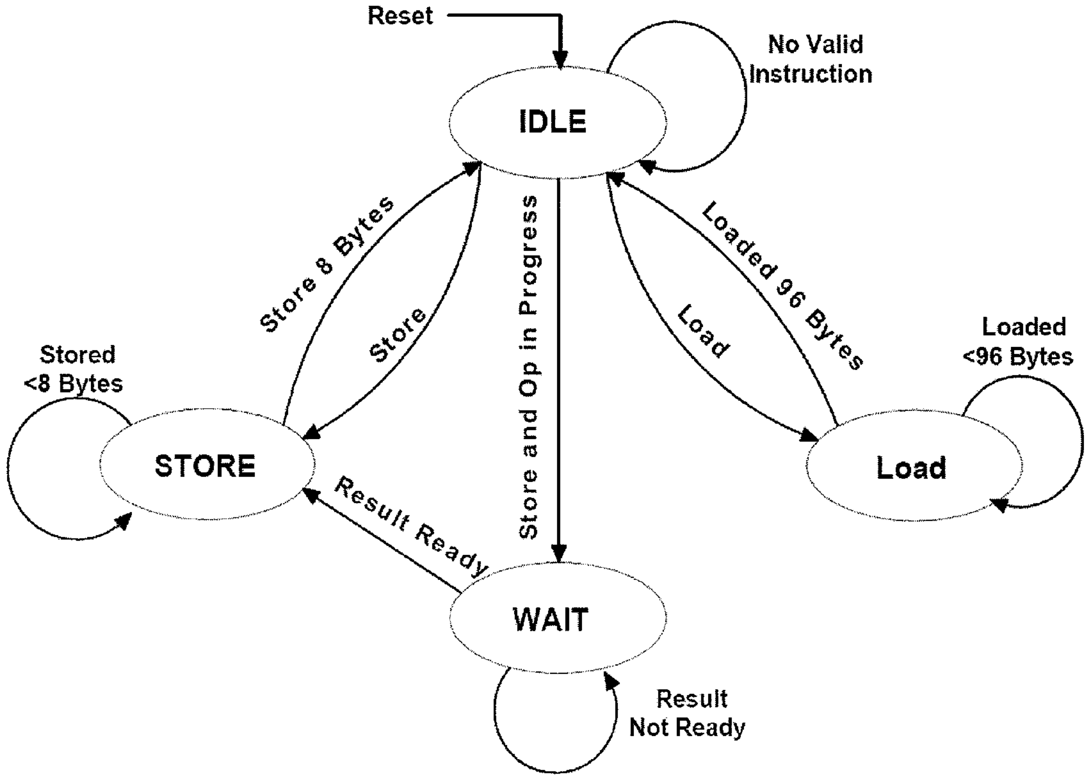
FIG. 5 is a diagram of a main state machine.

Finite state machines 40 are implemented in the accelerator 34 to decode instructions from the processor 30 and to fetch correct input data to the corresponding modules 35, 36. The processor 30 first recognizes the instruction as an extension and invokes the APU controller 31 to handle it. The APU controller 31 then passes the instruction to the hardware accelerator 34 through FCB 32. The decoder logic 33 in the hardware accelerator 34 decodes the instruction and waits for the data to be available from the APU controller 31 and triggers the corresponding module 35, 36 to execute the instruction. The data can be transferred from the main memory module 37 to the processor 30 and then to the hardware accelerator 34 by using a load instruction. The processor 30 can also invoke a store instruction to write the results returned from the hardware accelerator 34 back to the main memory module 37. FIG. 5 shows the main state machine 40 that is responsible for load and store operations. This state machine 40 communicates with the processor 30 using the APU controller 31.

The general procedure of invoking the accelerator 34 using an UPDATE operation 36 as an example is outlined below:

1. An UPDATE operation 36 begins with the processor 30 forwarding a load instruction to the APU controller 31. The load instruction refers to the input data in the main memory 37;
2. The APU controller 31 passes the instruction to the state machine 40 in the hardware accelerator 34. The state machine 40 decodes the instruction and waits for data from memory 37 to arrive via the APU controller 31;
3. The state machine 40 sends the input data to the FFT module 35;
4. When load instructions are completed, the processor 30 forwards a store instruction to the APU controller 31 in anticipation of the output;
5. The state machine 40 decodes the store instruction and waits for data from the IFFT module 35;
6. After processing by the UPDATE operation 36, the IFFT module 35 returns results to the state machine 40;
7. The state machine 40 returns the output data to the processor 30 via the APU controller 31. The data is written back to memory 37.

To achieve better performance, the FFT/IFFT 35 modules are implemented using a core generator provided by the vendor tools. However, the UPDATE module 36 is designed from scratch as it is not a general function.

Since the UPDATE operation 36 is a data-oriented application, it can be implemented by a combinational circuit. However, this approach infers a large number of functional units and thus requires a significant amount of hardware resources. By studying the data dependency and the data movement, it is possible to reduce the hardware resources by designing the UPDATE module 36 in a time-multiplexed fashion. The operations are scheduled in sequential or in parallel to tradeoff between performance and circuit area.

After scheduling is completed, the dataflow graph can be transformed into an Algorithmic State Machine (ASMD) chart. Since each time interval represents a state in the chart, a register is needed when a signal is passed through the state boundary. Additional optimization schemes can be applied to reduce the number of registers and to simplify the routing structure. For example, instead of creating a new register for each variable, an existing register is reused if its value is no longer needed.

Numerical Results

In order to simulate the situation of typical voice control devices, it is assumed there is a near-field noise of human speech and a far-field background noise of various kinds. The Noisex-92 database is used as the background noise. For the near-field noise and the calibration source signals, they are recorded in an anechoic environment with a sampling rate of 16 kHz. Two sets of commands are created to test the design. The first set consists of names of Christmas songs (jingle bells; santa claus is coming to town; sleigh ride; let it snow; winter wonderland) typically used in a musicbox. This is a typical command set with phrases. This set of commands is denoted by Musicbox. The second set of commands is a set of single word-based commands from number one to ten (one, two, three, four, five, . . . , ten). This set is a single word commands. This set of commands is denoted by One2Ten. These two command sets are encoded into a commercial speech recognizer "Sensory's FluentSoft" for experiments on voice control.

In the first test, a configuration of four element square microphone array with 30 cm apart horizontally and vertically is used. The speaker is positioned 1 metre away from the microphone array. The near-field noise is placed 1 m in front of the array and 1 metre to the left of the speaker. The far-field noise is set so that the signal-to-noise ratio is 0 dB. For the near-field signal, two signal-to-noise ratios (0 dB and −5 dB) are tested. In designing the beamformer, the filter length L=16 is used.

TABLE 2

Correct recognition rates for the Musicbox command set

| Far-field noise (SNR = 0 dB) | Near-field noise (SNR) | No filter (%) | LS (%) | SNR (%) | System (%) |
|---|---|---|---|---|---|
| White noise | 0 dB | 20 | 60 | 20 | 100 |
| | −5 dB | 0 | 60 | 0 | 80 |
| Pink noise | 0 dB | 40 | 60 | 20 | 80 |
| | −5 dB | 20 | 40 | 0 | 80 |
| Traffic noise | 0 dB | 40 | 80 | 80 | 100 |
| | −5 dB | 20 | 60 | 80 | 100 |
| Factory noise | 0 dB | 20 | 80 | 20 | 80 |
| | −5 dB | 0 | 40 | 0 | 80 |
| Buccaneer noise | 0 dB | 40 | 60 | 60 | 80 |
| | −5 dB | 20 | 40 | 40 | 80 |
| Babble noise | 0 dB | 40 | 100 | 40 | 100 |
| | −5 dB | 0 | 20 | 0 | 60 |
| School playground | 0 dB | 20 | 80 | 20 | 80 |
| | −5 dB | 0 | 40 | 0 | 80 |

TABLE 3

Correct recognition rates for the One2Ten command set

| Near-field noise (SNR = 0 dB) | Near-field noise (SNR) | No filter (%) | LS (%) | SNR (%) | System (%) |
|---|---|---|---|---|---|
| White noise | 0 dB | 10 | 40 | 60 | 80 |
| | −5 dB | 10 | 40 | 50 | 70 |
| Pink noise | 0 dB | 0 | 30 | 20 | 70 |
| | −5 dB | 0 | 30 | 50 | 60 |
| Traffic noise | 0 dB | 20 | 40 | 60 | 80 |
| | −5 dB | 10 | 30 | 40 | 60 |
| Factory noise | 0 dB | 20 | 30 | 20 | 60 |
| | −5 dB | 10 | 30 | 20 | 60 |
| Buccaneer noise | 0 dB | 0 | 30 | 30 | 70 |
| | −5 dB | 0 | 30 | 20 | 50 |
| Babble noise | 0 dB | 40 | 30 | 30 | 80 |
| | −5 dB | 20 | 30 | 20 | 80 |
| School playground | 0 dB | 40 | 30 | 20 | 80 |
| | −5 dB | 40 | 30 | 20 | 60 |

For the Musicbox command set, table 2 shows that the recognition accuracy has fallen below 40% without any filtering. The least-squares method and the SNR method have improved the accuracy to certain extent, but the improvement is rather erratic. For certain noise, there is no improvement or it is insignificant. However, by using the system, a fairly uniform improvement to 80% can be achieved for almost all the tested noise.

For the One2Ten set, table 3 shows that the findings are generally similar to the results for the Musicbox. Clearly the improvement is significant over the use of the least-squares method or the SNR method alone. Generally, this is not a recommended command set due to the similarity among commands and the short durations which make the recognition very difficult. Nevertheless, a reasonable improvement for this difficult command set is achieved.

In the second test, a typical office environment is used to carry out the experiment. A linear array of 3 elements with inter-element distance 20 cm is used. Loud music is played from a distance as the background noise. A near-field speech is emitted in front of the microphone array. This simulates the situation where it might be speech from the system talking to the user or another speaker nearby talking. The voice commands are emitted 80 cm in front of the microphone array. The configuration of the experiment is shown in FIG. 1. The test is performed for the Musicbox command set. The actual signal-to-noise ratios are measured by a sound pressure level (SPL) meter. The intensity of the noise sources are increased until the performance of the recognizer is just less than 50% accurate. Then two more volume levels are recorded by increasing the intensity of the noise sources further. A beamformer with filter length L=16 is designed for each signal-to-noise ratio. The experiment is repeated 80 times for each designed beamformer to check on the off-design performance. The final results are shown in Table 4. The results demonstrate that the system works well in a real home environment to enhance recognition accuracy.

TABLE 4

| Signal-to-noise ratio (dB) | System (%) | No filter (%) |
|---|---|---|
| 8.82 dB | 91.57% | 48.42% |
| 6.59 dB | 90% | 37.5% |
| 4.26 dB | 75% | 26% |

Figure 6:
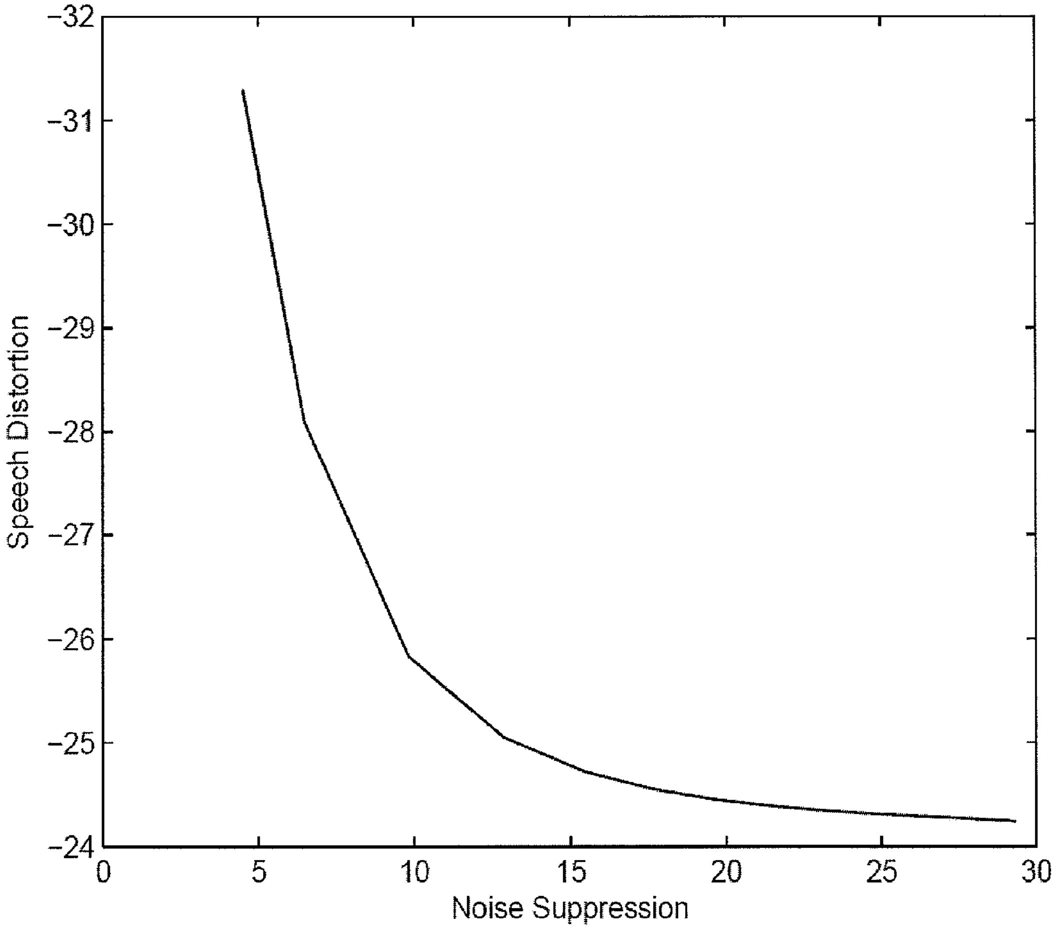
FIG. 6 is a chart depicting trade-off between noise and distortion levels.

The objectives for the beamformers are to maximize the noise and interference suppressions, while keeping distortion caused by beamforming filters to a minimum. Referring to FIG. 6, in order to understand the bi-criteria objective in the noise and interference suppression, the Pareto optimum set was constructed by varying $\theta$.

The performance of the FPGA-based LS and SNR beamformer that is equipped with one FFT/IFFT and one filter update hardware accelerator is evaluated by estimation. Assuming one block of data contains 64 samples under a 16 kHz sampling rate, the number of clock cycle required for processing the block of data in the frequency domain is measured as 823600. Therefore, given that the period of one clock cycle is 1/(184 MHz)=5.43 ns on a Virtex4 FPGA, the FPGA-based beamformer can perform one step of speech enhancement in 0.0045 s, or equivalently 14311 samples per second.

An equivalent software version is developed in ANSI C and compiled to native machine code using the Linux compiler GCC. It should be noted that the algorithm compiled using GCC has the optimization feature that is particularly useful with vector and matrix computations, which is used intensively in the LS and SNR beamformer. A test is performed by providing 290000 samples to the program and measure the time required to finish all the calculations. The test is carried on a Pentium M 1.6 GHz machine with 1 GB memory, and it takes an average of 71.3 seconds to finish the calculations. Therefore, the software performance is 290000/71.3=4067 samples per second. It shows that the FPGA-based beamformers can achieve 3.5 times speedup even with only one instance of hardware accelerator when compared with software running on a 1.6 GHz PC.

Multiple instances of the LS and SNR beamformers can be packed in a single large FPGA to boost the performance, which would be useful especially when the design has multiple channels. This technique can fully utilize the resource on the FPGA and gain massive speedup. Ideally, the speedup would scale linearly with the number of beamformer instances. In practice, the speedup grows slower than expected while the logic utilisation increases because the clock speed of the design deteriorates as the number of instances increases. This deterioration is probably due to the increased routing congestion and delay. A medium size FPGA is used to implement the hardware accelerator and can accommodate different combinations of FFT/IFFT and UPDATE within the hardware accelerator, which provides flexible solutions between speed and area trade-off.

Table 5 summarizes the implementation results when adding more instances of the filter in an XC4VSX55-12-FF1148 FPGA chip and shows how the number of instances affects the speedup. A XC4VSX55-12-FF1148 chip can accommodate at most two FFT/IFFT and UPDATE hardware accelerators, so the sampling rate will be 27804 samples per second. It achieves real-time performance.

TABLE 5

Slices and DSPs used and maximum frequency and sampling rate when implementing multiple instances on an XC4VSX55-12-FF1148 FPGA device.

| | Number of Instances | | Slices | DSP |
|---|---|---|---|---|
| | FFT/IFFT | Filter update | Used | Used |
| 14311 | 1 | 1 | 42% | 12% |
| 20035 | 1 | 2 | 64% | 19% |
| 26169 | 1 | 3 | 87% | 26% |
| 19627 | 2 | 1 | 62% | 16% |
| 27804 | 2 | 2 | 84% | 23% |
| 20444 | 3 | 1 | 77% | 21% |
| 20853 | 4 | 1 | 92% | 24% |

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

I claim:

1. A method for beamforming using a microphone array, the method comprising:

capturing an input, the input including an audio signal of interest and noise, using a microphone array;

providing a beamformer including two parallel adaptive filters, to filter the input, a first adaptive filter having low speech distortion (LS) and a second adaptive filter having high noise suppression (SNR), wherein each of the parallel adaptive filters has a different filter weight, a filter weight of the first adaptive filter is determined based on a least squares solution and a filter weight of the second adaptive filter is determined based on a quadratic ratio between an output signal power to an output noise power; and determining a weight (θ) to adjust a percentage of combining the adaptive filter weights; and generating an output of the beamformer by applying the weight (θ) to the adaptive filters.

2. The method according to claim 1, wherein the weight (θ) is determined by defining a linear combination of the optimal filter weights to produce a balance between minimising distortion and maximising noise suppression which are continuously adjusted.

3. The method according to claim 1, wherein the adjusting of the weight (θ) is by applying a hybrid descent algorithm based on a combination of a simulated annealing algorithm and a simplex search algorithm.

4. The method according to claim 1, wherein the weight (θ) is adjusted depending on the application.

5. The method according to claim 4, wherein the application is to maximize speech recognition accuracy.

6. The method according to claim 1, further comprising an initial step of pre-calibration.

7. The method according to claim 1, wherein the adaptive filters are processed in parallel.

8. The method according to claim 7, wherein the adaptive filters finish processing in a same clock cycle.

9. The method according to claim 1, wherein the adaptive filters are selected to have different distinctive properties.

10. A system for beamforming the system comprising:

a microphone array that captures an input, the input including an audio signal of interest and noise;

a beamformer including two parallel adaptive filters, to filter the input, a first adaptive filter having low speech distortion (LS) and a second adaptive filter having high noise suppression (SNR), wherein each of the parallel adaptive filters has a different filter weight, a filter weight of the first adaptive filter is determined based on a least squares solution and a filter weight of the second adaptive filter is determined based on a quadratic ratio between an output signal power to an output noise power; and a controller to determine a weight (θ) for adjusting a percentage of combining the adaptive filter weights and to apply the weight (θ) to the adaptive filters for an output of the beamformer.

11. The system according to claim 10, further comprising a noise only detector to adapt filter coefficients only when there is noise present in the audio signal.

12. The system according to claim 10, wherein the system is implemented by a Field Programmable Gate Array (FPGA), the FPGA comprising:

a computer processor;

an Auxiliary Processor Unit (APU) interface in operative connection with the computer processor;

a Fabric Co-processor Bus (FCB) in operative connection with the APU interface; and a hardware accelerator in operative connection with the FCB, the hardware accelerator including an FCB interface, Fast Fourier Transform/Inverse Fast Fourier Transform (FFT/IFFT) module and a Least Squares (LS) and Signal to Noise Ratio (SNR) UPDATE module.

13. A method for beamforming using a microphone array, the method comprising:

capturing an input, the input including an audio signal of interest and noise, using the microphone array;

providing a beamformer comprising at least two parallel adaptive filters, to filter the input, having different distinctive properties; and determining a weight (θ) for each filter to adjust a percentage of combining the adaptive filter weights, wherein each filter has a different filter weight, a filter weight of the first adaptive filter is determined based on a least squares solution and a filter weight of the second adaptive filter is determined based on a quadratic ratio between an output signal power to an output noise power; and generating an output of the beamformer by applying the weight (θ) to the adaptive filters.

14. The method for beamforming according to claim 13, wherein the at least two parallel adaptive filters include a parallel adaptive filter having low speech distortion (LS) or a parallel adaptive filter having high noise suppression.

15. The method for beamforming according to claim 13, wherein the at least two parallel adaptive filters have a different signal distortion and noise suppression property from each other.

* * * * *